United States Patent
Farre Guiu et al.

(10) Patent No.: US 10,891,985 B1
(45) Date of Patent: Jan. 12, 2021

(54) BI-LEVEL SPECIFICITY CONTENT ANNOTATION USING AN ARTIFICIAL NEURAL NETWORK

(71) Applicant: Disney Enterprises, Inc., Burbank, CA (US)

(72) Inventors: Miquel Angel Farre Guiu, Bern (CH); Monica Alfaro Vendrell, Barcelona (ES); Albert Aparicio Isarn, Barcelona (ES); Daniel Fojo, Barcelona (ES); Marc Junyent Martin, Barcelona (ES); Anthony M. Accardo, Los Angeles, CA (US); Avner Swerdlow, Los Angeles, CA (US)

(73) Assignee: Disney Enterprises, Inc., Burbank, CA (US)

(*) Notice: Subject to any disclaimer, the term of this patent is extended or adjusted under 35 U.S.C. 154(b) by 0 days.

(21) Appl. No.: 16/509,422

(22) Filed: Jul. 11, 2019

(51) Int. Cl.
| | |
|---|---|
| *H04N 9/80* | (2006.01) |
| *G11B 27/00* | (2006.01) |
| *G11B 27/34* | (2006.01) |
| *G06K 9/00* | (2006.01) |
| *G06N 3/08* | (2006.01) |
| *G06N 3/04* | (2006.01) |
| *G11B 27/19* | (2006.01) |
| *H04N 5/93* | (2006.01) |
| *H04N 5/78* | (2006.01) |
| *H04N 5/92* | (2006.01) |

(52) U.S. Cl.
CPC .......... *G11B 27/34* (2013.01); *G06K 9/00744* (2013.01); *G06N 3/04* (2013.01); *G06N 3/08* (2013.01); *G11B 27/19* (2013.01)

(58) Field of Classification Search
USPC ....... 386/241, 239, 240, 248, 278, 282, 280, 386/314, 326
See application file for complete search history.

(56) References Cited

U.S. PATENT DOCUMENTS

| | | | |
|---|---|---|---|
| 9,767,409 B1 * | 9/2017 | Makhijani | G06F 16/7867 |
| 2007/0260639 A1 * | 11/2007 | Tobin | G06F 16/5838 |
| 2015/0346955 A1 * | 12/2015 | Fundament | G11B 27/00 715/765 |
| 2018/0101957 A1 * | 4/2018 | Talathi | G06K 9/46 |
| 2019/0171908 A1 * | 6/2019 | Salavon | G06F 16/55 |

* cited by examiner

*Primary Examiner* — Daquan Zhao
(74) *Attorney, Agent, or Firm* — Farjami & Farjami LLP

(57) ABSTRACT

A content annotation system includes a computing platform having a hardware processor and a memory storing a tagging software code including an artificial neural network (ANN). The hardware processor executes the tagging software code to receive content having a content interval including an image of a generic content feature, encode the image into a latent vector representation of the image using an encoder of the ANN, and use a first decoder of the ANN to generate a first tag describing the generic content feature based on the latent vector representation. When a specific content feature learned by the ANN corresponds to the generic content to feature described by the first tag, the tagging software code uses a second decoder of the ANN to generate a second tag uniquely identifying the specific content feature based on the latent vector representation, and tags the content interval with the first and second tags.

20 Claims, 5 Drawing Sheets

BI-LEVEL SPECIFICITY CONTENT ANNOTATION USING AN ARTIFICIAL NEURAL NETWORK

BACKGROUND

Due to its nearly universal popularity as a content medium, ever more video is being produced and made available to users. As a result, the efficiency with which video content can be annotated and managed has become increasingly important to the producers and owners of that video content.

Annotation of video content has traditionally been performed manually by human annotators. However, such manual annotation, or "tagging," of video is a labor intensive and time consuming process. Consequently, there is a need in the art for an automated solution for annotating content that substantially minimizes the amount of content, such as video, that needs to be manually processed

SUMMARY

There are provided systems and methods for automating the performance of bi-level specificity content annotation using an artificial neural network (ANN), substantially as shown in and/or described in connection with at least one of the figures, and as set forth more completely in the claims.

DETAILED DESCRIPTION

Figure 1:
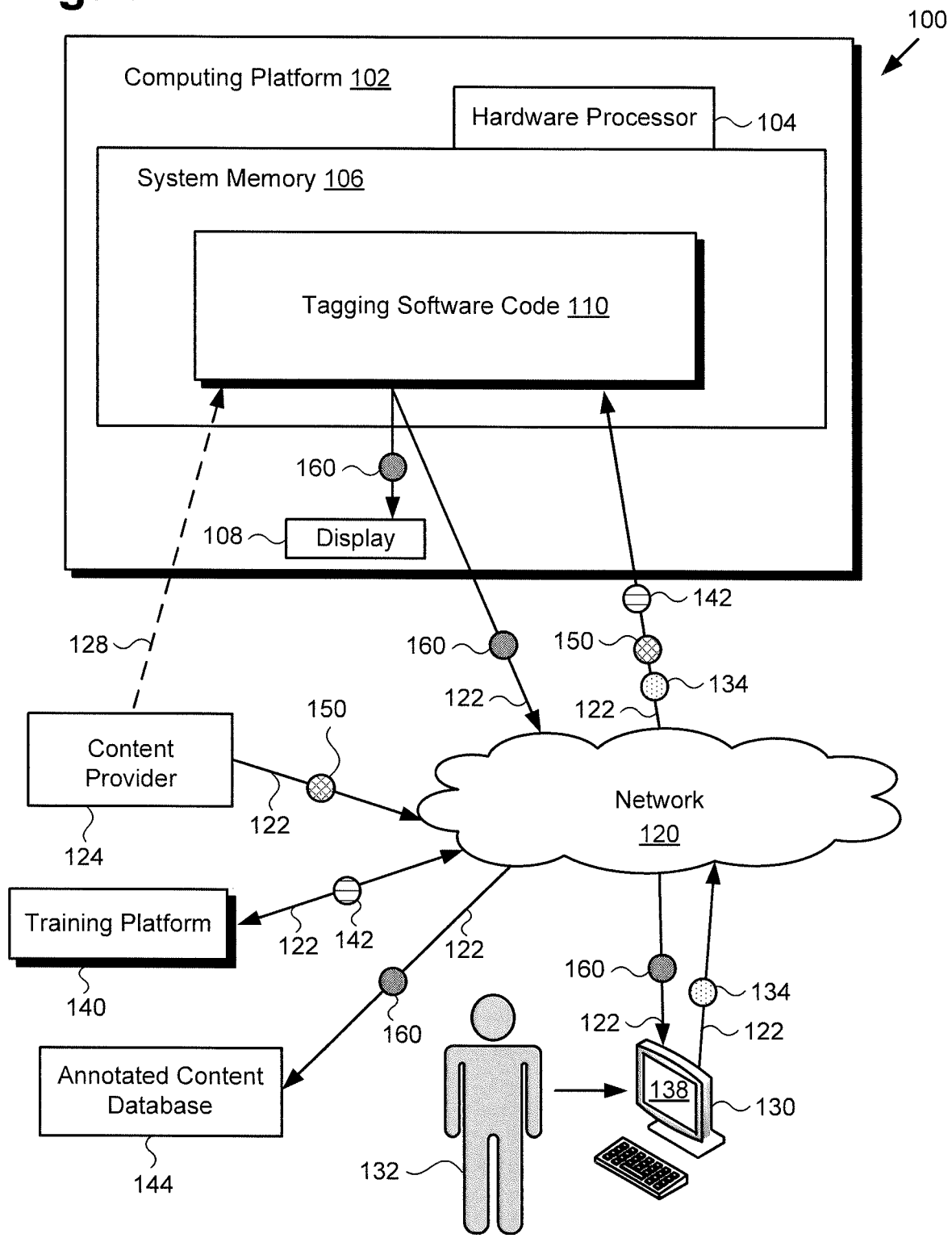
FIG. 1 shows a diagram of an exemplary system for performing automated bi-level specificity content annotation, according to one implementation.

The following description contains specific information pertaining to implementations in the present disclosure. One skilled in the art will recognize that the present disclosure may be implemented in a manner different from that specifically discussed herein. The drawings in the present application and their accompanying detailed description are directed to merely exemplary implementations. Unless noted otherwise, like or corresponding elements among the figures may be indicated by like or corresponding reference numerals. Moreover, the drawings and illustrations in the present application are generally not to scale, and are not intended to correspond to actual relative dimensions.

The present application discloses systems and methods for performing automated bi-level specificity content annotation using an artificial neural network (ANN), that overcomes the drawbacks and deficiencies in the conventional art. It is noted that, as used in the present application, the terms "automation," "automated", and "automating" refer to systems and processes that do not require the participation of a human user, such as a human system administrator. Although, in some implementations, a human administrator may review annotation tags generated by the automated systems and according to the automated methods described herein, that human involvement is optional. Thus, the methods described in the present application may be performed under the control of hardware processing components of the disclosed automated systems.

It is further noted that, as defined in the present application, an ANN, also known simply as a neural network (NN), is a type of machine learning framework in which patterns or learned representations of observed data are processed using highly connected computational layers that map the relationship between inputs and outputs. A "deep neural network", in the context of deep learning, may refer to a neural network that utilizes multiple hidden layers between input and output layers, which may allow for learning based on features not explicitly defined in raw data. "Online deep learning" may refer to a type of deep learning in which machine learning models are updated using incoming data streams, and are designed to progressively improve their performance of a specific task as new data is received and/or adapt to new patterns of a dynamic system. As such, various forms of ANNs may be used to make predictions about new data based on past examples or "training data." In various implementations, ANNs may be utilized to perform image processing or natural-language processing.

FIG. 1 shows a diagram of an exemplary system for performing automated bi-level specificity content annotation using an ANN, according to one implementation. As shown in FIG. 1, content annotation system 100 includes computing platform 102 having hardware processor 104, system memory 106 implemented as a non-transitory storage device storing tagging software code 110, and may include display 108. It is noted that display 108 may be implemented as a liquid crystal display (LCD), a light-emitting diode (LED) display, an organic light-emitting diode (OLED) display, or any other suitable display screen that performs a physical transformation of signals to light.

Figure 3:
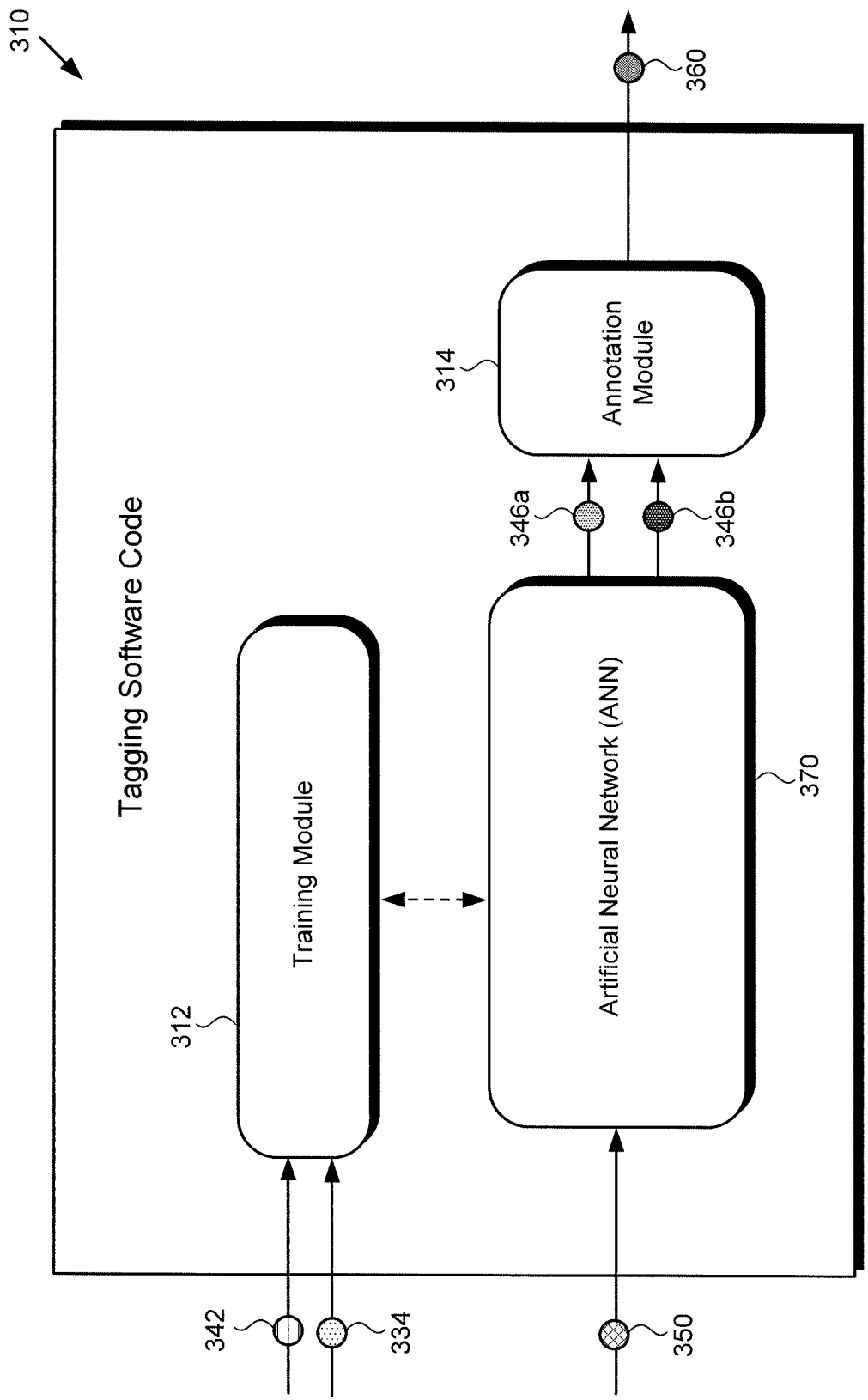
FIG. 3 shows an exemplary content tagging software code including an artificial neural network (ANN) and suitable for use by the system shown in FIG. 1, according to one implementation.
Figure 4:
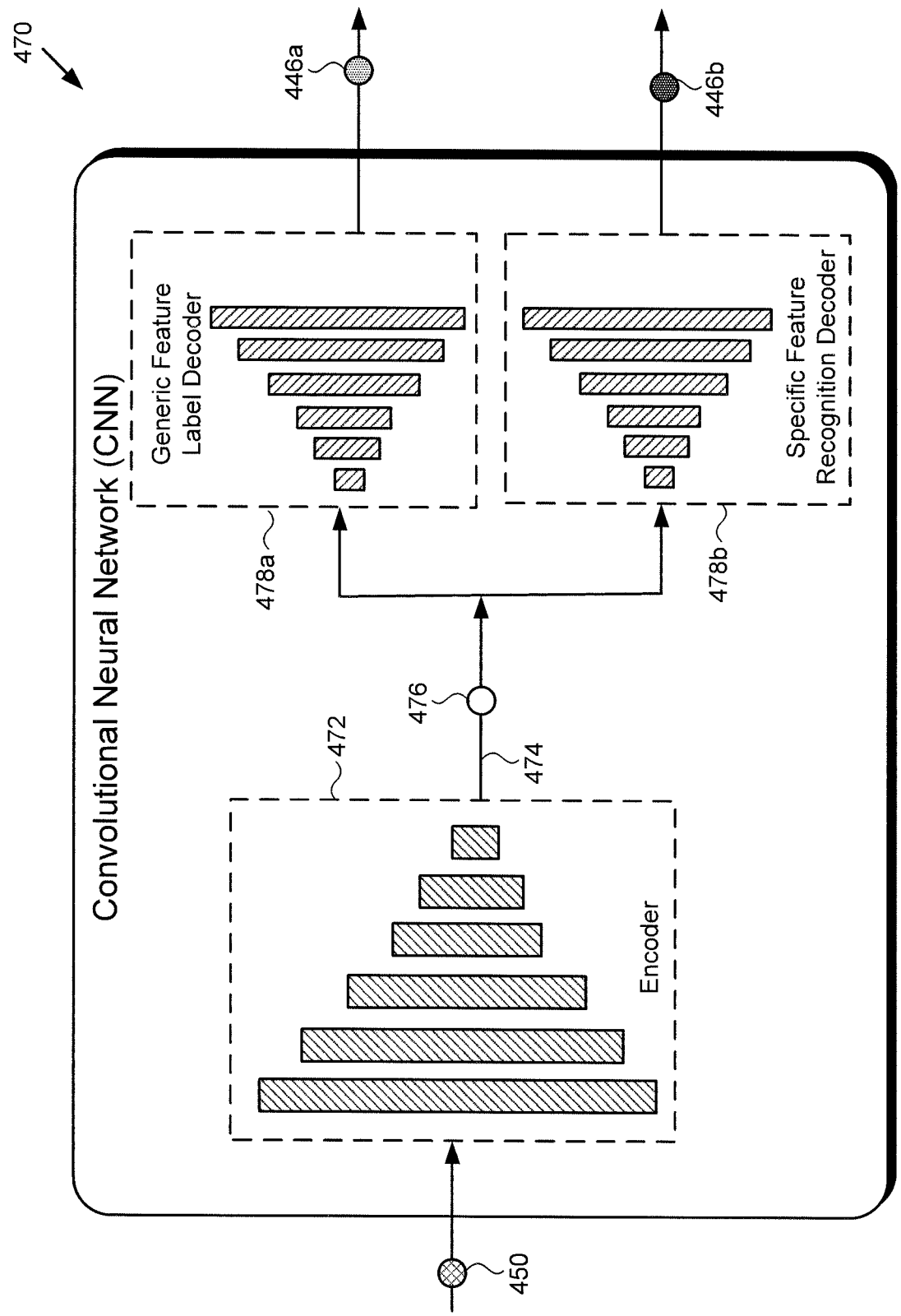
FIG. 4 shows a more detailed diagram of the ANN shown in FIG. 3 in the form of a convolutional neural network (CNN) having first and second decoders coupled to the output of a shared encoder, according to one exemplary implementation.

It is also noted that, as shown by FIGS. 3 and 4 and described below, tagging software code 110 includes an ANN, which may be implemented as a convolutional neural network (CNN) configured to produce annotated content 160 based on content 150 in an automated process. As further shown in FIG. 1, content annotation system 100 is implemented within a use environment including content provider 124 providing content 150, training platform 140 providing training data 142, annotated content database 144, communication network 120 and annotation administrator 132 utilizing user system 130 including display 138.

Also shown in FIG. 1 are network communication links 122 communicatively coupling content provider 124, training platform 140, annotated content database 144, and user system 130 with content annotation system 100 via communication network 120, as well as validation data 134 provided by annotation administrator 132. It is noted that although content annotation system 100 may receive content 150 from content provider 124 via communication network 120 and network communication links 122, in some implementations, content provider 124 may take the form of a content database integrated with computing platform 102, or may be in direct communication with content annotation system 100 as shown by dashed communication link 128.

It is also noted that although user system 130 is shown as a desktop computer in FIG. 1, that representation is provided merely as an example as well. More generally, user system 130 may be any suitable mobile or stationary computing device or system that implements data processing capabilities sufficient to implement the functionality ascribed to user system 130 herein. For example, in other implementations, user system 130 may take the form of a laptop computer, tablet computer, or smartphone, for example. Furthermore, display 138 of user system 130 may be implemented as an LCD, an LED display, an OLED display, or any other suitable display screen that performs a physical transformation of signals to light.

Tagging software code 110, when executed by hardware processor 104 of computing platform 102, is configured to produce annotated content 160 based on content 150. Although the present application refers to tagging software code 110 as being stored in system memory 106 for conceptual clarity, more generally, system memory 106 may take the form of any computer-readable non-transitory storage medium.

The expression "computer-readable non-transitory storage medium," as used in the present application, refers to any medium, excluding a carrier wave or other transitory signal that provides instructions to hardware processor 104 of computing platform 102. Thus, a computer-readable non-transitory medium may correspond to various types of media, such as volatile media and non-volatile media, for example. Volatile media may include dynamic memory, such as dynamic random access memory (dynamic RAM), while non-volatile memory may include optical, magnetic, or electrostatic storage devices. Common forms of computer-readable non-transitory media include, for example, optical discs, RAM, programmable read-only memory (PROM), erasable PROM (EPROM), and FLASH memory.

Moreover, although FIG. 1 depicts training platform 140 as a computer platform remote from content annotation system 100, that representation is also merely exemplary. More generally, content annotation system 100 may include one or more computing platforms, such as computer servers for example, which may form an interactively linked but distributed system, such as a cloud based system, for instance. As a result, hardware processor 104 and system memory 106 may correspond to distributed processor and memory resources within content annotation system 100, while training platform 140 may be a component of content annotation system 100 or may be implemented as a software module stored in system memory 106. In one implementation, computing platform 102 of content annotation system 100 may correspond to one or more web servers, accessible over a packet-switched network such as the Internet, for example. Alternatively, computing platform 102 may correspond to one or more computer servers supporting a wide area network (WAN), a local area network (LAN), or included in another type of limited distribution or private network.

Figure 2:
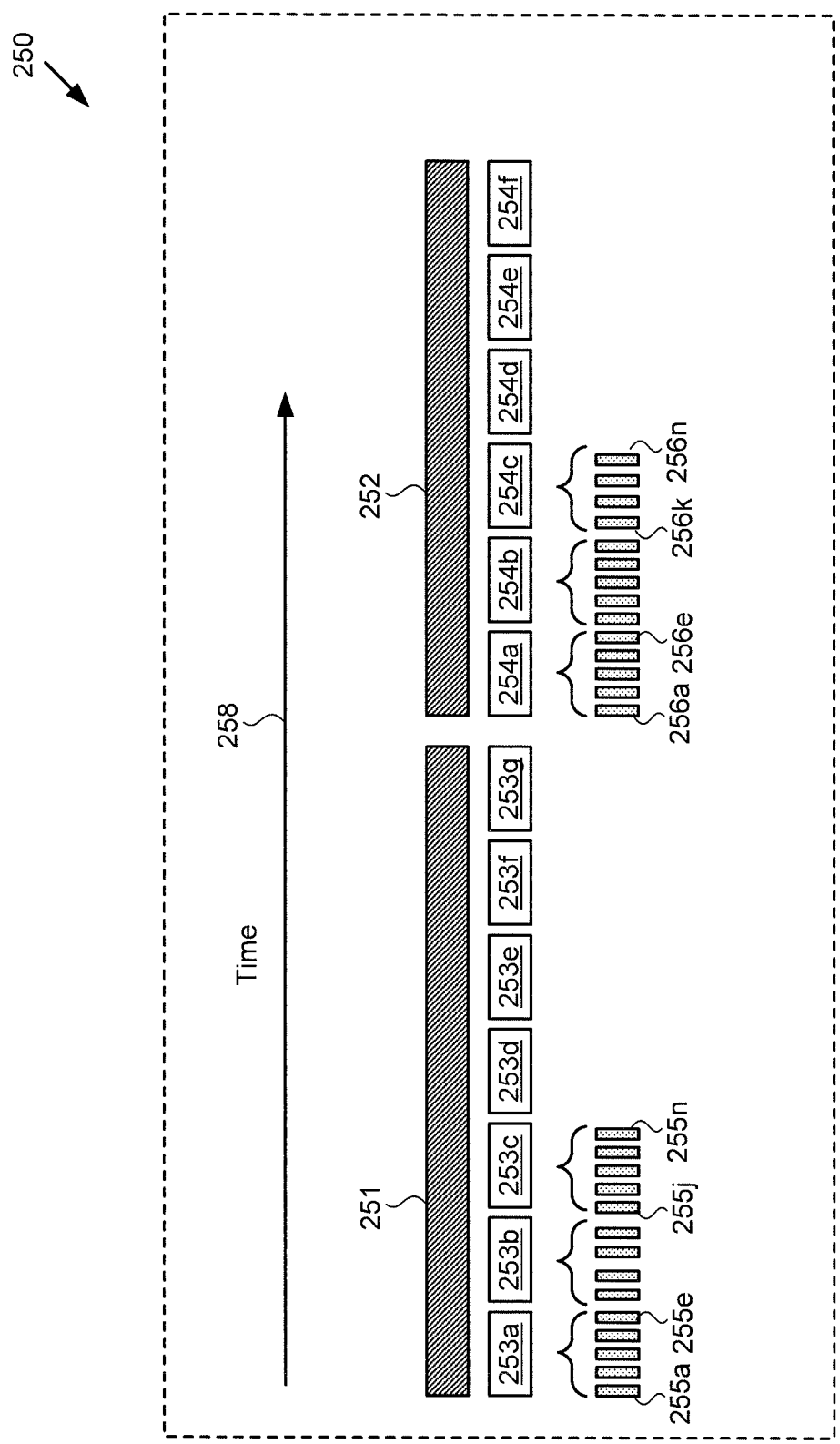
FIG. 2 shows a diagram of a portion of video content including content intervals at various levels of granularity, according to one implementation.

FIG. 2 shows a diagram of a portion of content 250 in the form of video content including content intervals at various levels of granularity, according to one implementation. According to the exemplary implementation shown in FIG. 2, content 250 includes content intervals in the form of scenes 251 and 252, shots 253a, 253b, 253c, 253d, 253e, 253f, and 253g (hereinafter "shots 253a-253g"), and shots 254a, 254b, 254c, 254d, 254e, and 254f (hereinafter "shots 254a-254f"). In addition, FIG. 2 shows content intervals of content 250 in the form of frames 255a through 255n, of which fames 255a, 255e, 255j, and 255n are explicitly identified as such, as well as frames 256a through 256n, of which fames 256a, 256e, 256k, and 256n are explicitly identified as such. Also shown in FIG. 2 is timecode 258 of content 250, which may be used to timestamp or otherwise identify the start and/or end times of various scenes, shots, and frames included in content 250.

With respect to the expressions "shot" or "shots" of video, it is noted that, as used in the present application, the term "shot" refers to a sequence of frames within a video file that are captured from a unique camera perspective without cuts and/or other cinematic transitions. Moreover, as used in the present application, the term "scene" refers to a series of semantically connected shots. Thus, according to the implementation shown in FIG. 2, scene 251 includes shots 253a-253g, where exemplary shot 253a includes frames 255a-255e, while scene 252 includes shots 254a-254f, where exemplary shot 254c includes frames 256k-256n. That is to say, different scenes may include different numbers of shots, while different shots may include different numbers of frames.

Content 250 corresponds in general to content 150, in FIG. 1, and those corresponding features may share any of the characteristics attributed to either feature by the present disclosure. In other words, although not shown in FIG. 1, content 150 may include content intervals corresponding respectively to one or more of scenes 251 and 252, shots 253a-253g, shots 254a-254f, frames 255a-255n, and frames 256a-256n. As noted above, content 150/250 may be video content, such as a movie, an episode of television (TV) or video log (Vlog) content, or a commercial, for example.

FIG. 3 shows exemplary tagging software code 310 suitable for use by content annotation system 100 in FIG. 1, according to one implementation. As shown in FIG. 3, tagging software code 310 includes training module 312, ANN 370, and annotation module 314. In addition, FIG. 3 shows training data 342, validation data 334, content 350, and annotated content 360. Also shown in FIG. 3 are first tag 346a output by ANN 370 and describing a generic content feature of content 350, and second tag 346b, also output by ANN 370 but uniquely identifying a specific content feature of content 350 that corresponds to the generic content feature described by first tag 346a.

It is noted that the content features that ANN 370 may be trained to identify include various types of generic and specific content features, such as actors, characters, actions, objects, and locations, to name a few examples. For instance, a particular actor may be a specific content feature, while a character may be a generic content feature or a specific content feature. That is to say, a character identified by a functional role, such as "dad," "doctor," "police officer," is a generic content feature, while a character having a specific identity in addition to a functional role is a specific content feature. Analogously, an activity such as "exercising" may be considered a generic content feature, while the more specific activities of running or biking may be specific content features. As another example of generic and specific activities, "cleaning a lamp" may be a generic content feature, but "calling the Genie" by Aladdin via the activity of cleaning a lamp is specific content feature.

Tagging software code 310, training data 342, validation data 334, and annotated content 360 correspond respectively in general to tagging software code 110, training data 142, validation data 134, and annotated content 160, in FIG. 1. That is to say, tagging software code 110, training data 142, validation data 134, and, annotated content 160 may share any of the characteristics attributed to respective tagging software code 310, training data 342, validation data 334, and annotated content 360 by the present disclosure, and vice versa. Thus, although not shown explicitly shown in FIG. 1, tagging software code 110 may include features corresponding to each of training module 312, ANN 370 providing first tag 346a and second tag 346b as outputs, and annotation module 314.

In addition, content 350 corresponds in general to content 150/250 in FIGS. 1 and 2. In other words, content 350 may share any of the characteristics attributed to content 150/250 by the present disclosure, and vice versa. Thus, like content 150/250, content 350 may take the form of video content, such as movie content, an episode of TV or Vlog content, or a commercial. Moreover, like content 150/250, content 350 may include content intervals corresponding respectively to one or more of scenes 251 and 252, shots 253a-253g, shots 254a-254f, frames 255a-255n, and frames 256a-256n.

FIG. 4 shows a more detailed diagram of ANN 370, in FIG. 3, in the form of CNN 470, according to one exemplary implementation. As shown in FIG. 4, CNN 470 includes encoder 472 configured to receive content 450 and to provide latent vector representation 476 of an image included in content 450 from output 474 of encoder 472. It is noted that tagging software code 110/310, when executed by hardware processor 104, performs an encoding process using encoder 472 of CNN 470 that maps or projects the image included in content 450 onto a latent space common to other images encoded using encoder 472. That mapping or projection of the image included in content 450 onto the latent space is then provided at output 474 of encoder 472 as latent vector representation 476 of the image.

As further shown in FIG. 4, CNN 470 includes first decoder 478a and second decoder 478b coupled in parallel to output 474 of encoder 472. It is noted that first encoder 478a is implemented as a generic feature label decoder, while second encoder 478b is implemented as a specific feature recognition decoder. Also shown in FIG. 4 are first tag 446a output by first decoder 478a of CNN 470, and second tag 446b output by second decoder 478b of CNN 470.

CNN 470 providing first tag 446a and second tag 446b corresponds in general to ANN 370 providing first tag 346a and second tag 346b, in FIG. 3. Consequently, CNN 470, first tag 446a, and second tag 446b may share any of the features attributed to ANN 370, first tag 346a, and second tag 346b by the present disclosure, and vice versa. In other words, like CNN 470, ANN 370 may include features corresponding respectively to encoder 472 producing latent vector representation 476, and first and second decoders 478a and 478b coupled in parallel to output 474 of encoder 472.

Moreover, content 450 corresponds in general to content 150/250/350 in FIGS. 1, 2, and 3. That is to say, content 450 may share any of the characteristics attributed to content 150/250/350 by the present disclosure, and vice versa. Thus, like content 150/250/350, content 450 may take the form of video content, such as movie content, an episode of TV or Vlog content, or a commercial. In addition, like content 150/250/350, content 450 may include content intervals corresponding respectively to one or more of scenes 251 and 252, shots 253a-253g, shots 254a-254f, frames 255a-255n, and frames 256a-256n.

Figure 5:
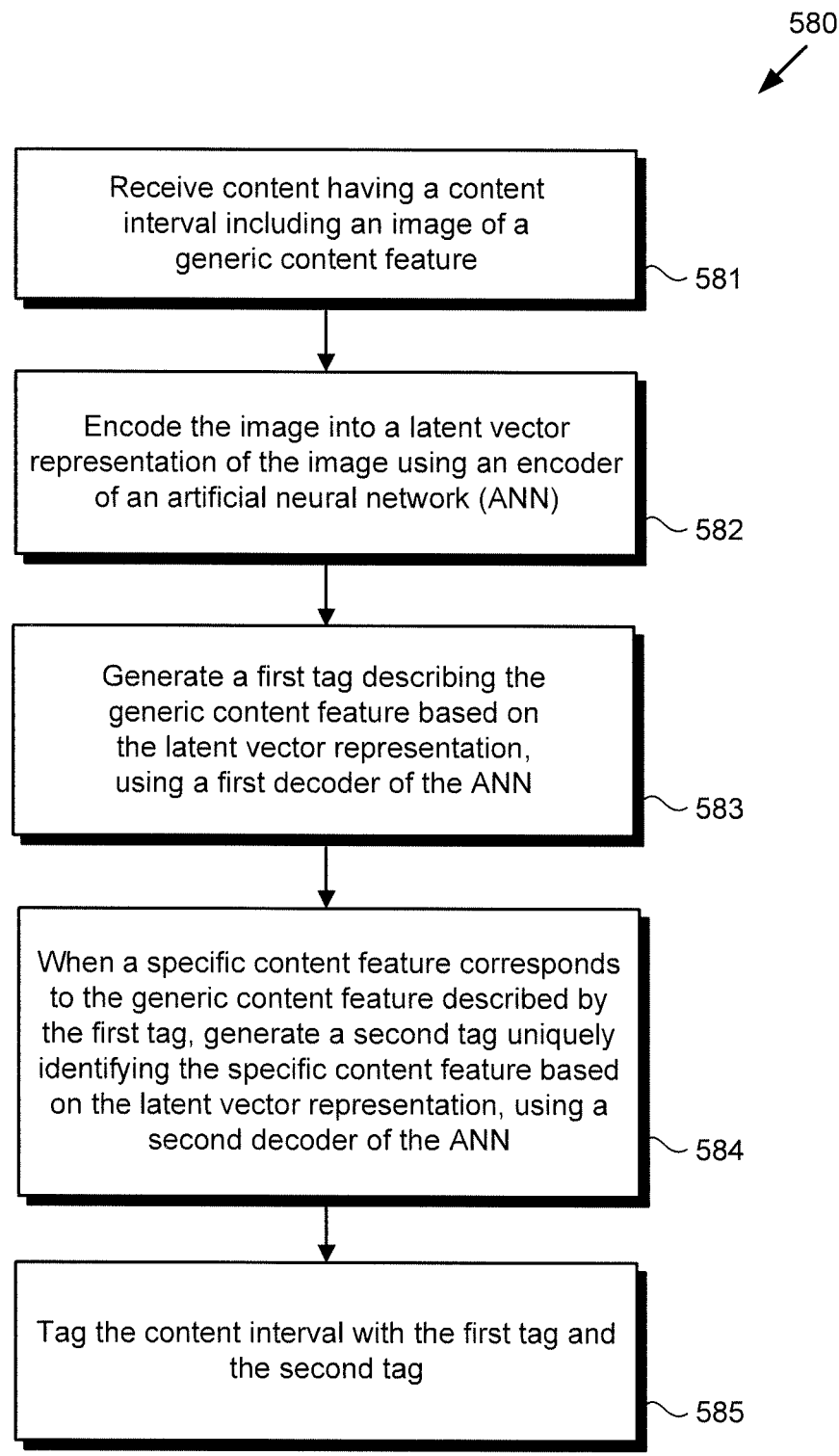
FIG. 5 shows a flowchart presenting an exemplary method for performing automated bi-level specificity content annotation, according to one implementation.

The functionality of content annotation system 100 including tagging software code 110/310 will be further described by reference to FIG. 5 in combination with FIGS. 1, 2, 3, and 4. FIG. 5 shows flowchart 580 presenting an exemplary method for use by a system to perform automated bi-level specificity content annotation. With respect to the method outlined in FIG. 5, it is noted that certain details and features have been left out of flowchart 580 in order to not obscure the discussion of the inventive features in the present application.

As a preliminary matter, ANN 370/CNN 470 is trained to identify multiple generic content features and multiple specific content features. ANN 370/CNN 470 may be trained using training platform 140, training data 142, and training module 312 of tagging software code 110/310. As noted above, the content features that ANN 370/CNN 470 may be trained to identify include various types of content features, such as actors, characters, actions, objects, and locations, to name a few examples. Nevertheless, in the interests of conceptual clarity, the training and operational performance of content annotation system 100 is described below by reference to an exemplary implementation in which the content features being tagged are locations depicted by content 150/250/350/450.

ANN 370/CNN 470 learns about locations appearing in labeled training content 142/342 provided as training inputs. It is noted that training content 142/342 may include scene start/end timestamps, as well as location tags set at the beginning of the appearance of each location. The location tags used in training can be generic locations (e.g., kitchen, bathroom), specific real-world locations (e.g., U.S. Interstate 5), fictional locations (e.g., residence of a character), or an iconic location (e.g., Eiffel Tower, Empire State Building).

Using the labeled content training inputs described above, ANN 370/CNN 470 learns how to classify locations that appear in content 150/250/350/450 and to tag that content following the same rules learned from labeled training content 142/342. As a first step, the possible location tags may be divided into two types: 1) generic locations, and 2) specific locations including real-world, fictional, and iconic locations. According to one implementation, each frame of training content 142/342 may have two tags, one generic and one specific.

Using labeled training content 142/342 including location tags and scene information, frames of training content 142/342 can be extracted and one or two tags can be assigned to each frame by a human annotator, taking into account the scene and the shot corresponding to each tag. For generic location tags, the areas from which frames are extracted to create a training dataset may start at the timestamp position of the tag and may end at the end of the last shot before the next generic tag included in labeled training content 142/342, for example.

The training may be done progressively to show ANN 370/CNN 470 the two types of tags that are desired as outputs. In a first training stage, the training dataset inputs and the generic tags may be fed to ANN 370/CNN 470. In a second stage, training dataset inputs and the specific tags may be fed to ANN 370/CNN 470.

In some implementations, the training may be performed in parallel when first decoder 478a and second decoder 478b share some layers. During such parallel training, each frame of labeled training content 142/342 can arrive labeled with a single tag (i.e., generic or specific), or with two tags (generic and specific). Where labeled training content 142/342 arrives with two tags, the frame need be processed only once by the common part of ANN 370/CNN 470, e.g., encoder 472. Once the labeled image arrives at the neural network layers of first decoder 478a and second decoder 478b that differentiate the specialized and generic tags, the image can be processed sequentially, for example first the generic content feature can be tagged, followed by the specific content feature.

During training, validation of the learning process may be performed by annotation administrator 132, who may utilize user system 130 to evaluate annotated content 160/360 generated during training and provide validation data 134/334 based on the accuracy with which annotated content 160/360 has been tagged.

Alternatively, validation of the learning can be performed as an automated process where validation data 134/334 was previously tagged by a human annotator. The validation process disclosed herein goes one step further than conventional validation schemes where a subset of frames that the neural net never saw is shown to verify that it is learning. According to the present inventive principles, by contrast, the content used for validation includes images that ANN 370/CNN 470 has never seen that contain only de minimis representation of content features different from the particular content features being trained.

As a specific example of such training and validation, where locations are being trained, training content 142/342 used for training or validation may substantially omit representation of persons or characters so that ANN 370/CNN 470 focuses its learning on the locations per se, rather than on the persons or characters associated with those locations. Once training and validation are completed, tagging software code 110/310 including ANN 370/CNN 470 may be utilized in an automated process to produce bi-level specificity annotated content 160/360 based on content 150/250/350/450 as outlined by flowchart 580.

Referring now to FIG. 5 in combination with FIGS. 1, 2, 3, and 4, flowchart 580 begins with receiving content 150/250/350/450 having a content interval including an image of a generic content feature (action 581). In the exemplary use case in which the content features with which content 150/250/350/450 is to be annotated are locations, such a generic content feature may be a house, an apartment, a particular room in a residence, such as a kitchen of living room, the exterior of a building, or a street, to name a few examples.

Referring to FIG. 2, the content interval including the image of the generic content feature may include scene 251, one or more of shots 253a-253g, and one or more of frames 255a-255n. Alternatively, or in addition, the content interval received in action 581 may include scene 252, one or more of shots 254a-254f, and one or more of frames 256a-256n. Content 150/250/350/450 may be received by tagging software code 110/310 of content annotation system 100, executed by hardware processor 104. As shown in FIG. 1, in one implementation, content 150/250/350/450 may be received by content annotation system 100 from content provider 124 via communication network 120 and network communication links 122, or directly from content provider 124 via communication link 128.

Flowchart 580 continues with encoding the image into latent vector representation 476 of the image using encoder 472 of ANN 370/CNN 470 (action 582). Tagging software code 110/310, when executed by hardware processor 104, utilizes ANN 370/CNN 470 to perform an encoding process on the image carried by content 150/250/350/450 in which that image is mapped to a latent space representation of the image. The latent space representation of the image is then output to first and second decoders 478a and 478b as latent vector representation 476.

Flowchart 580 continues with generating first tag 346a/446a describing the generic content feature depicted in the content interval of content 150/250/350/450 received in action 581, based on latent vector representation 476 (action 583). Generation of first tag 346a/446a describing the generic content feature may be performed by tagging software code 110/310, executed by hardware processor 104, and using first decoder 478a of ANN 370/CNN 470.

Referring to FIG. 2, where content 150/250/350/450 is video content, the content interval for which first tag 346a/446a is being generated may be one or more shots 253a-253g, as well as scene 251 including those one or more shots. For example, in one implementation in which content 150/250/350/450 takes the form of video, such as a movie, an episode of TV or. Vlog content, or a commercial for instance, first tag 346a/446a may be generated for shot 253c, for example, when the number of video frames 255j-255n of shot 253c that include the image of the generic content feature meets a predetermined threshold. As a specific example, if three or more of frames 255j-255n of shot 253c include an image of a building, generic first tag 346a/446a "building" may be generated for shot 253c. However, if less than three of frames 255j-255n include an image of a building, shot 253c may not be tagged with the generic location description "building."

More generally, a particular content interval is tagged with first tag 346a/446a when the number of video frames of the content interval that include the image of the generic content feature meets a predetermined threshold. Thus, by analogy, when the content interval is a scene, such as scene 251 including shot 253c, first tag 346a/446a may be generated for scene 251 when the number of frames or shots that include the image of the generic content feature meets a predetermined threshold. As a specific example, if four or more of shots 253a-253g of scene 251 include an image of a building, generic first tag 346a/446a "building" may be generated for scene 251. However, if three or less of shots 253a-253g include an image of a building, scene 251 may not be tagged with the generic location description "building."

In other words, a content interval may be tagged with first tag 346a/446a when a number of video frames of the content interval that include the image of the generic content feature meets a first predetermined threshold, when a number of video shots of the content interval that include the image of the generic content feature meets a second predetermined threshold, or when a number of video scenes of the content interval that include the image of the generic content feature meets a third predetermined threshold.

When a specific content feature that ANN 370/CNN 470 has been trained to identify corresponds to the generic content feature described by first tag 346a/446a, flowchart 580 continues with generating second tag 346b/446b uniquely identifying the specific content feature based on latent vector representation 476 (action 584). Generation of second tag 346b/446b uniquely identifying the specific content feature may be performed by tagging software code 110/310, executed by hardware processor 104, and using second decoder 478b of ANN 370/CNN 470.

It is noted that where the generic content features that ANN 370/CNN 470 has been trained to identify are generic locations depicted in content 150/250/350/450, the specific content features that ANN 370/CNN 470 has been trained to identify include specific locations each of which corresponds to one or more of the generic locations. For instance, the specific location "Empire State Building" may correspond to the generic location "building," as well as to the generic location "high rise" or "sky scraper."

Referring to FIG. 2 once again, and returning to the exemplary use case in which content 150/250/350/450 is video content, such as a movie, an episode of TV or Vlog content, or a commercial, second tag 346b/446b may be generated for scene 251 when a number of frames of a shot that include the image of the specific content feature corresponding to the generic content feature described by first tag 346a/446a meets a predetermined threshold. Alternatively, second tag 346b/446b may be generated for scene 251 when the number of shots of scene 251 that include the image of the specific content feature corresponding to the generic content feature described by first tag 346a/446a meets a predetermined threshold. As a specific example, if four or more of shots 253a-253g of scene 251 include images of a building described as such by first tag 346a/446a, and three of those four shots include building images identified as the Empire State Building, second tag 346b/446b "Empire State Building" may be generated for scene 251. However, if less than three of shots 253a-253g include an image of the Empire State Building, scene 251 may not be tagged as that specific location.

As noted above, specific locations can include real-world locations, fictional locations, and/or iconic locations. For instance, "Empire State Building" is a specific location that is concurrently a real-world location and an iconic location, and that also corresponds to the generic location "building." As another example "Tower of Sauron" in the realm of Mordor described by J. R. R. Tolkien is a fictional location that may correspond to the same generic location "building." As defined for the purposes of the present application, the expression "iconic location" refers to a location that is reasonably contemplated as being recognizable to a target audience for content 150/250/350/450. Thus, the status of a location as "iconic" may depend in part on the age, cultural heritage, or geographical region of domicile of the target audience for content 150/250/350/450. Moreover, it is noted that in some instances, e.g., Santa Claus's North Pole Toyshop, a location may be both fictional and iconic.

Flowchart 580 can conclude with tagging the content interval with first tag 346a/446a and second tag 346b/446b (action 585). Depending on the level of annotation granularity desired, when content 150/250/350/450 includes video content, the tagging performed in action 585 may be applied at the frame level, shot level, and/or at the scene level. Moreover, the actions described by flowchart 580 may be performed for any or all of the content intervals included in content 150/250/350/450. Action 585 may be performed by tagging software code 110/310, executed by hardware processor 104, and using annotation module 314.

For instance, referring to FIG. 2, one or both of scenes 251 and 252 may be tagged using the same or different first tag 346a/446a and the same or different second tag 346b/446b. As a specific example of the foregoing, where scenes 251 and 252 are content intervals in an episode of TV content in the form of a show about cooking or chefs, scene 251 may take place in a fictional home kitchen of fictional character "A," and scene 252 takes place in a famous real-world "Kitchen B." In that case, scene 251 may be tagged with generic first tag 346a/446a "kitchen" and specific second tag 346b/446b "A's kitchen," while scene 252 may be tagged with the same generic first tag 346a/446a "kitchen" but different specific second tag 346b/446b "Kitchen B."

Alternatively, where scenes 251 and 252 are content intervals in an episode of TV content in the form of a show about cooking or chefs, scene 251 may take place in the real-world "Kitchen B" of famous Restaurant B, while scene 252 takes place in the dining room where food prepared in "Kitchen B" is served to diners, i.e., "Dining Room B." In that case, scene 251 may be tagged with generic first tag 346a/446a "kitchen" and specific second tag 346b/446b "Kitchen B," while scene 252 may be tagged with different generic first tag 346a/446a "dining room" and different specific second tag 346b/446b "Dining Room B." As another example, the same second tag identifying a specific content feature, e.g., "Character C's house," could be associated with several generic first tags identifying different rooms within the house as Character C moves from the kitchen to the living room to the bedroom.

Action 585 results in production of bi-level specificity annotated content 160/360 based on content 150/250/350/450. Once produced using tagging software code 110/310, annotated content 160/360 may be stored locally in system memory 106 of content annotation system 100, or may be transmitted, via communication network 120 and network communication links 122, to annotated content database 144 for storage.

In some implementations, annotated content 160/360, including its annotations, may be rendered on display 108, or may be transmitted to user system 130 for rendering on display 138. As noted above. display 108 and 138 may include LCDs, LED displays, OLED displays, or any other suitable display screens that perform a physical transformation of signals to light. When rendered on display 108 of content annotation system 100, rendering of annotated content 160/360 on display 108 may be performed by tagging software code 110/310, executed by hardware processor 104 of computing platform 102.

It is noted that although action 585 refers to tagging the content interval with first tag 346a/446a and second tag 346b/446b, in some implementations, the generic content feature tagged with first tag 346a/446a may not correspond to a specific content feature identified by ANN 370/CNN 470. In those implementations, the content interval may be tagged only with first tag 346a/446a. Furthermore, in some implementations, it is possible that no tag, i.e., neither of first tag 346a/446a or second tag 346b/446b, is applied to the content interval.

Thus, the present application discloses systems and methods for performing automated bi-level specificity content annotation using an ANN, that overcomes the drawbacks and deficiencies in the conventional art. From the above description it is manifest that various techniques can be used for implementing the concepts described in the present application without departing from the scope of those concepts. Moreover, while the concepts have been described with specific reference to certain implementations, a person of ordinary skill in the art would recognize that changes can be made in form and detail without departing from the scope of those concepts. As such, the described implementations are to be considered in all respects as illustrative and not restrictive. It should also be understood that the present application is not limited to the particular implementations described herein, but many rearrangements, modifications, and substitutions are possible without departing from the scope of the present disclosure.

What is claimed is:

1. A content annotation system comprising:
a computing platform having a hardware processor and a memory storing a tagging software code including an artificial neural network (ANN) trained to identify at least one generic content feature and at least one specific content feature;
the hardware processor configured to execute the tagging software code to:
receive content having a content interval including an image of the at least one generic content feature;
encode the image into a latent vector representation of the image using an encoder of the ANN;

generate a first tag describing the at least one generic content feature based on the latent vector representation, using a first decoder of the ANN;

when the at least one specific content feature corresponds to the at least one generic content feature described by the first tag, generate a second tag uniquely identifying the at least one specific content feature based on the latent vector representation, using a second decoder of the ANN; and tag the content interval with the first tag and the second tag.

2. The content annotation system of claim 1, wherein the first decoder and the second decoder of the ANN are coupled in parallel to an output of the encoder.

3. The content annotation system of claim 1, wherein the ANN comprises a convolutional neural network (CNN).

4. The content annotation system of claim 1, wherein the at least one generic content feature comprises a generic location depicted in the content, and wherein the at least one specific content feature comprises a specific location corresponding to the generic location.

5. The content annotation system of claim 4, wherein the specific location comprises a real-world location.

6. The content annotation system of claim 4, wherein the specific location comprises a fictional location.

7. The content annotation system of claim 4, wherein the specific location comprises an iconic location.

8. The content annotation system of claim 1, wherein the content comprises video, and wherein the content interval is tagged with the first tag when:
   a number of video frames of the content interval that include the image of the at least one generic content feature meets a first predetermined threshold,
   a number of video shots of the content interval that include the image of the at least one generic content feature meets a second predetermined threshold, or
   a number of video scenes of the content interval that include the image of the at least one generic content feature meets a third predetermined threshold.

9. The content annotation system of claim 1, wherein the content comprises video, wherein the content interval is a shot of the video, and wherein the shot is tagged with the second tag when a number of frames of the shot that include the image of the at least one specific content feature corresponding to the at least one generic content feature described by the first tag meets a predetermined threshold.

10. The content annotation system of claim 1, wherein the content comprises video, wherein the content interval is a scene of the video, and wherein the scene is tagged with the second tag when a number of shots of the scene that include the at least one specific content feature corresponding to the at least one generic content feature described by the first tag meets a predetermined threshold.

11. A method for use by a content annotation system including a computing platform having a hardware processor and a memory storing a software code including an artificial neural network (ANN) trained to identify at least one generic content feature and at least one specific content feature, the method comprising:

receiving, by the software code executed by the hardware processor, content having a content interval including an image of the at least one generic content feature;

encoding the image into a latent vector representation of the image, by the software code executed by the hardware processor, and using an encoder of the ANN;

generating, by the software code executed by the hardware processor, a first tag describing the at least one generic content feature based on the latent vector representation, using a first decoder of the ANN;

when the at least one specific content feature corresponds to the at least one generic content feature described by the first tag, generating, by the software code executed by the hardware processor, a second tag uniquely identifying the at least one specific content features based on the latent vector representation, using a second decoder of the ANN; and tagging the content interval with the first tag and the second tag, by the software code executed by the hardware processor.

12. The method of claim 11, wherein the first decoder and the second decoder of the ANN are coupled in parallel to an output of the encoder.

13. The method of claim 11, wherein the ANN comprises a convolutional neural network (CNN).

14. The method of claim 11, wherein the at least one generic content feature comprises a generic location depicted in the content, and wherein the at least one specific content feature comprises a specific location corresponding to the generic location.

15. The method of claim 14, wherein the specific location comprises a real-world location.

16. The method of claim 14, wherein the specific location comprises a fictional location.

17. The method of claim 14, wherein the specific location comprises an iconic location.

18. The method of claim 11, wherein the content comprises video, and wherein the content interval is tagged with the first tag when:
   a number of video frames of the content interval that include the image of the one of the plurality of generic content features meets a predetermined threshold,
   a number of video shots of the content interval that include the image of the at least one generic content feature meets a second predetermined threshold, or
   a number of video scenes of the content interval that include the image of the at least one generic content feature meets a third predetermined threshold.

19. The method of claim 11, wherein the content comprises video, wherein the content interval is a shot of the video, and wherein the shot is tagged with the second tag when a number of frames of the shot that include the image of the at least one specific content feature corresponding to the at least one generic content feature meets a predetermined threshold.

20. The method of claim 11, wherein the content comprises video, wherein the content interval is a scene of the video, and wherein the scene is tagged with the second tag when a number of shots of the scene that include the at least one specific content feature corresponding to the at least one generic content feature described by the first tag meets a predetermined threshold.

* * * * *